United States Patent
Yamada et al.

(10) Patent No.: US 6,332,553 B1
(45) Date of Patent: Dec. 25, 2001

(54) STRING-ATTACHED CAP

(75) Inventors: Tatsuo Yamada; Shinji Araki, both of Tokyo (JP)

(73) Assignee: Calsonic Corporation, Tokyo (JP)

( * ) Notice: Subject to any disclaimer, the term of this patent is extended or adjusted under 35 U.S.C. 154(b) by 0 days.

(21) Appl. No.: 09/526,056

(22) Filed: Mar. 15, 2000

(30) Foreign Application Priority Data

Oct. 22, 1999 (JP) ................................................. 11-301567

(51) Int. Cl.$^7$ .................................................. B65D 55/16
(52) U.S. Cl. ................................. 220/375; 220/DIG. 33; 428/36.4; 296/97.22
(58) Field of Search ............................ 220/375, DIG. 33, 220/288, 88.1; 296/97.22; 428/36.4, 35.7

(56) References Cited

U.S. PATENT DOCUMENTS

| | | | |
|---|---|---|---|
| 4,320,853 | * 3/1982 | Moore | .................................. 220/375 |
| 4,597,504 | * 7/1986 | Witt . | |
| 4,974,307 | * 12/1990 | Uebayashi . | |
| 5,720,409 | 2/1998 | Asakura et al. | ...................... 220/375 |
| 5,798,060 | * 8/1998 | Brevett . | |
| 5,992,669 | * 11/1999 | Hagano et al. | ................ 220/DIG. 33 |
| 6,003,709 | * 12/1999 | Hagano et al. | ................ 220/DIG. 33 |
| 6,164,482 | * 12/2000 | Araki et al. | .................... 220/DIG. 33 |

FOREIGN PATENT DOCUMENTS

| | | |
|---|---|---|
| 62-173321 | 7/1987 | (JP) . |
| 3-295723 | 12/1991 | (JP) . |
| 10-211821 | * 8/1998 | (JP) . |
| 11-180171 | * 7/1999 | (JP) . |

* cited by examiner

*Primary Examiner*—Nathan J. Newhouse
(74) *Attorney, Agent, or Firm*—Sughrue Mion, PLLC

(57) ABSTRACT

An annular groove is formed in a cap body of a cap. An elongated coupling member has a ring part formed integrally therewith, and is coupled to the cap as the ring part is engaged in the annular groove. The cap and the coupling member are each formed of electroconductive resin, and the surface resistance from the cap to the vehicle is set to be greater than or equal to $1 \times 10^{12}$ Ω and less than $5.30 \times 10^{12}$ Ω. Hence, when the human body is brought into contact with the cap, static electricity in the human body is discharged to the vehicle side, and no shock is imparted to the human body. In addition, the amount of residual charge also declines without causing secondary spark discharge.

20 Claims, 13 Drawing Sheets

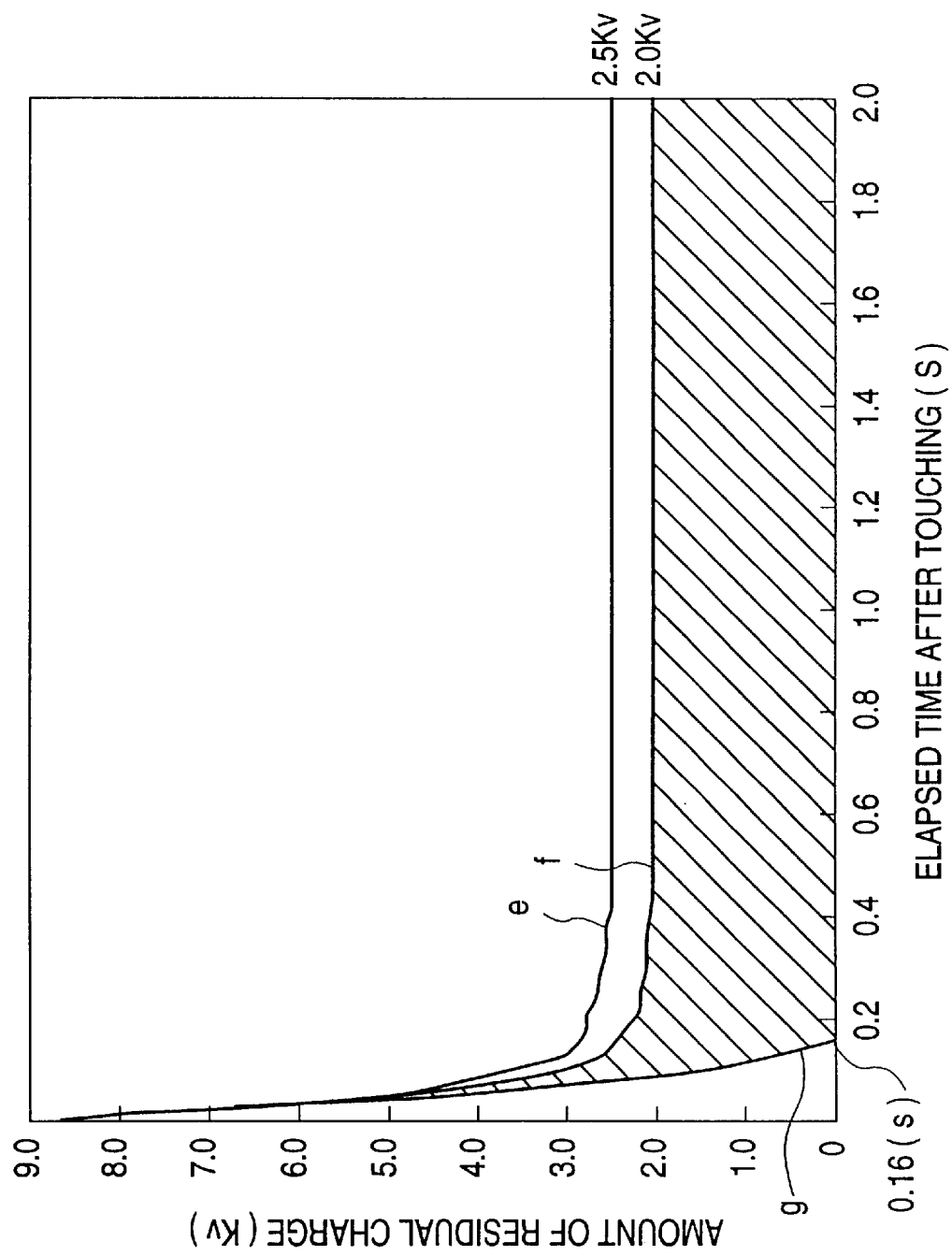

FIG. 7

| CARBON CONTENT IN COUPLING MEMBER | ITEM | CARBON CONTENT IN CAP | | | | | |
|---|---|---|---|---|---|---|---|
| | | 4% | 5% | 6% | 7% | 8% | 9% |
| 3% | SURFACE RESISTANCE (Ω) | $7.74 \times 10^{12}$ | $6.48 \times 10^{12}$ | $4.19 \times 10^{12}$ | $3.63 \times 10^{12}$ | $2.26 \times 10^{12}$ | $1.60 \times 10^{12}$ |
| | AMOUNT OF RESIDUAL CHARGE (kv) | 2.50 | 2.20 | 1.10 | 1.00 | 0.80 | 0.70 |
| | ORGANOLEPTIC EVALUATION | ○ | ○ | ○ | ○ | ○ | ○ |
| 4% | SURFACE RESISTANCE (Ω) | $5.86 \times 10^{12}$ | $5.30 \times 10^{12}$ | $3.54 \times 10^{12}$ | $2.73 \times 10^{12}$ | $1.80 \times 10^{12}$ | $1.12 \times 10^{12}$ |
| | AMOUNT OF RESIDUAL CHARGE (kv) | 2.20 | 2.00 | 1.10 | 1.00 | 0.85 | 0.80 |
| | ORGANOLEPTIC EVALUATION | ○ | ○ | ○ | ○ | ○ | ○ |
| 5% | SURFACE RESISTANCE (Ω) | $4.02 \times 10^{12}$ | $3.83 \times 10^{12}$ | $2.60 \times 10^{12}$ | $1.94 \times 10^{12}$ | $1.83 \times 10^{12}$ | $9.07 \times 10^{11}$ |
| | AMOUNT OF RESIDUAL CHARGE (kv) | 1.00 | 0.95 | 0.25 | 0.15 | 0.10 | 0.00 |
| | ORGANOLEPTIC EVALUATION | ○ | ○ | ○ | ○ | ○ | △ |
| 6% | SURFACE RESISTANCE (Ω) | $8.21 \times 10^{11}$ | $7.74 \times 10^{11}$ | $8.45 \times 10^{10}$ | $6.00 \times 10^{6}$ | $3.57 \times 10^{6}$ | $2.09 \times 10^{6}$ |
| | AMOUNT OF RESIDUAL CHARGE (kv) | 0.15 | 0.15 | 0.00 | 0.00 | 0.00 | 0.00 |
| | ORGANOLEPTIC EVALUATION | △ | △ | △ | × | × | × |

STRING-ATTACHED CAP

BACKGROUND OF THE INVENTION

1. Field of the Invention

The present invention relates to a string-attached cap in which one end of an elongated coupling member is connected to a cap.

The present application is based on Japanese Patent Application No. Hei. 11-301567, which is incorporated herein by reference.

2. Description of the Related Art

In a fuel tank of an automobile, a cap is, in general, connected to the fuel tank by means of an elongated coupling member to prevent the loss of the cap during re-fueling. As such string-attached caps, those disclosed in, for example, Japanese Patent Publications No. Hei. 3-295723 and Sho. 62-173321 or the like are known.

FIG. 21 shows the string-attached cap disclosed in Japanese Patent Publication No. Hei. 3-295723, and in this string-attached cap one end of a coupling member 13 is connected to a handle portion 5a of a cap 5 by means of a fixing member 1.

However, with such a conventional string-attached cap, since the coupling member 3 is connected to the cap 5 by means of the fixing member 1, there has been a problem in that the number of component parts increases, requiring a large number of steps in assembly in accordance with a structure of the fixing member.

A string-attached cap disclosed in U.S. Pat. No. 5,720,409 was developed to overcome these problems.

FIG. 22 shows this string-attached cap. This string-attached cap is arranged such that a coupling member 13, which is formed of flexible resin, has a ring part 13a formed integrally at one end thereof, and an engaging part 13b formed integrally with the inner periphery of the ring part 13a is rotatably engaged in an annular groove lid formed in the outer periphery of a cap 11.

With this string-attached cap, since the ring part 13a of the coupling member 13 is inserted and fitted in the annular groove 11d formed in the cap 11, the coupling member 13 does not constitute an obstruction when the cap 11 is turned while gripping a handle portion 11b.

In addition, when the cap 11 is inserted into the ring portion 13a of the coupling member 13, the engaging part 13b at the inner periphery of the ring part 13a is elastically deformed, and if the cap 11 in this state is inserted up to the annular groove 11d, the engaging part 13b is restored to its original state and is engaged in the annular groove 11d, so that the number of assembling steps can be substantially reduced as compared with the conventional art.

However, with the above-described conventional string-attached cap, since a countermeasure against static electricity is not provided, at the time of removing the cap from the fuel tank, there is the risk of occurrence of spark discharge as static electricity charged in the human body is discharged through fingers and the like which came into contact with the cap. To resolve this spark charge, it is conceivable to form the string-attached cap of, for example, an electroconductive material and discharge the static electricity to the vehicle side. The electroconductive material can be constituted by, for example, an electroconductive resin; however, in the compounding of the electroconductive material which is mixed into it, there is the possibility that the following problem can be occur.

Namely, if the amount of the electroconductive material mixed is extremely small, electric conduction is lowered, and the discharge of static electricity does not take place completely, so that there are cases where the remaining static electricity causes secondary spark discharge. On the other hand, if the amount of the electroconductive material mixed is extremely large, although electric conduction is enhanced, there can arise cases in which the moment the human body comes into contact with the cap, the human body receives a large shock.

SUMMARY OF THE INVENTION

The present invention has been devised to overcome the above-described problems of the conventional art, and its object is to provide a string-attached cap which is capable of discharging static electricity without imparting a shock to the human body and of positively preventing the occurrence of secondary spark discharge.

According to a first aspect of the present invention, there is provided a string-attached cap comprising: a capping member formed of a first electroconductive resin; and an elongated coupling member having one end connected to the capping member, the elongated coupling member being formed of a second electroconductive resin and being flexible, and the string-attached cap being used with another end of the coupling member coupled to a vehicle, wherein the first electroconductive resins and the second electroconductive resin are formed such that surface resistance from the capping member to the vehicle is set to be greater than or equal to $1 \times 10^{12}$ $\Omega$ and less than $5.30 \times 10^{12}$ $\Omega$.

According to a second aspect of the present invention, there is provided a string-attached cap comprising: a capping member formed of a first electroconductive resin; an elongated coupling member formed of a second electroconductive resin and being flexible; and a fastening member formed of a third electroconductive resin for fastening one end of the coupling member to the capping member, the string-attached cap being used with another end of the coupling member coupled to a vehicle, wherein the first electroconductive resins, the second electroconductive resin, and the third electroconductive resin are formed such that surface resistance from the capping member to the vehicle is set to be greater than or equal to $1 \times 10^{12}$ $\Omega$ and less than $5.30 \times 10^{12}$ $\Omega$.

According to a third aspect of the present invention, there is provided a string-attached cap comprising: a capping member formed of a first electroconductive resin; a ring member engaged in an outer periphery of the capping member; an elongated coupling member formed of a second electroconductive resin which is flexible; and a fastening member formed of a third electroconductive resin for fastening one end of the coupling member to the ring member, the ring member being formed of a fourth electroconductive resin, the string-attached cap being used with another end of the coupling member coupled to a vehicle, wherein the first electroconductive resins, the second electroconductive resin, the third electroconductive resin, and the fourth electroconductive resin are formed such that surface resistance from the capping member to the vehicle is set to be greater than or equal to $1 \times 10^{12}$ $\Omega$ and less than $5.30 \times 10^{12}$ $\Omega$.

According to a fourth aspect of the present invention, there is provided a string-attached cap comprising: a capping member formed of a first electroconductive resin and having an annular groove formed in its outer periphery; and an elongated coupling member formed of a second electroconductive resin and being flexible, the coupling member having a ring member formed integrally at one end thereof, an engaging part which is formed integrally with an inner periphery of the ring part being rotatably engaged in the annular groove of the capping member, the string-attached cap being used with another end of the coupling member coupled to a vehicle, wherein the first electroconductive resins and the second electroconductive resin are formed such that surface resistance from the capping member to the vehicle is set to be greater than or equal to $1\times10^{12}$ Ω and less than $5.30\times10^{12}$ Ω.

According to a fifth aspect of the present invention, all of the electroconductive resins in the aforementioned aspects are each formed of a mixture of an insulating polymer and one of carbon powders, carbon fibers and metal fibers in the string-attached cap according to the first to fourth aspects of the present invention.

According to a sixth aspect of the present invention, the second electroconductive resin for forming the coupling member has its insulating component consisting of an insulating polymer of a block copolymer including a hard segment and a soft segment, the soft segment containing a polyether component in the string-attached cap according to the fifth aspect of the present invention.

According to a seventh aspect of the present invention, the first electroconductive resin for forming the capping member and the second electroconductive resin for forming the coupling member are each formed of a mixture of an insulating polymer and carbon powder, a content of the carbon powder being set in a range of from 4% to 9% as weight percentage for the first electroconductive resin and in a range of from 3% to 5% as weight percentage for the second electroconductive resin, a combination in which the content thereof in the first electroconductive resin is 9% and the content thereof in the second electroconductive resin is 5% as well as combinations in which the content thereof in the first electroconductive resin is in a range of from 4% to 5% and the content thereof in the second electroconductive resin is in a range of from 3% to 4% are being excluded in the string-attached cap according to the fifth and sixth aspects of the present invention.

According to an eighth aspect of the present invention, there is provided a string-attached cap comprising: a capping member formed of a first electroconductive resin; and an elongated coupling member having one end connected to the capping member, the elongated coupling member being formed of a second electroconductive resin and being flexible, wherein the first electroconductive resin and the second electroconductive resin are each formed of a mixture of an insulating polymer and one of carbon powders, carbon fibers and metal fibers, and the insulating polymer of the second electroconductive resin is formed of an insulating polymer of a block copolymer including a hard segment and a soft segment, the soft segment containing a polyether component.

According to a ninth aspect of the present invention, there is provided a string-attached cap comprising: a capping member formed of a first electroconductive resin; an elongated coupling member formed of a second electroconductive resin and being flexible; and a fastening member formed of a third electroconductive resin for fastening one end of the coupling member to the capping member, wherein the first electroconductive resin, the second electroconductive resin and the third electroconductive resin are each formed of a mixture of an insulating polymer and one of carbon powders, carbon fibers and metal fibers, and the insulating polymer of the second electroconductive resin is formed of an insulating polymer of a block copolymer including a hard segment and a soft segment, the soft segment containing a polyether component.

According to a tenth aspect of the present invention, there is provided a string-attached cap comprising: a capping member formed of a first electroconductive resin; a ring member engaged in an outer periphery of the capping member; an elongated coupling member formed of a second electroconductive resin which is flexible; and a fastening member formed of a third electroconductive resin for fastening one end of the coupling member to the ring member, wherein the ring member is formed of a fourth electroconductive resin, and the first electroconductive resin, the second electroconductive resin, the third electroconductive resin and the fourth electroconductive resin are each formed of a mixture of an insulating polymer and one of carbon powders, carbon fibers and metal fibers, and the insulating polymer of the second electroconductive resin is formed of an insulating polymer of a block copolymer including a hard segment and a soft segment, the soft segment containing a polyether component.

According to an eleventh aspect of the present invention, there is provided a string-attached cap comprising: a capping member formed of a first electroconductive resin and having an annular groove formed in its outer periphery; and an elongated coupling member formed of a second electroconductive resin and being flexible, the coupling member having a ring member formed integrally at one end thereof, an engaging part which is formed integrally with an inner periphery of the ring part being rotatably engaged in the annular groove of the capping member, the string-attached cap being used with another end of the coupling member coupled to a vehicle, wherein the first electroconductive resin and the second electroconductive resin are each formed of a mixture of an insulating polymer and one of carbon powders, carbon fibers and metal fibers, and the insulating polymer of the second electroconductive resin is formed of an insulating polymer of a block copolymer including a hard segment and a soft segment, the soft segment containing a polyether component.

In the invention according to the first aspect, since the capping member and the elongated coupling member are coupled to each other and are respectively formed of a first electroconductive resin and a second electroconductive resin, the string-attached cap can be maintained at the same potential as that of the vehicle body.

In addition, since the first electroconductive resin and the second electroconductive resin are formed such that surface resistance from the capping member to the vehicle is set to be greater than or equal to $1\times10^{12}$ Ω and less than $5.30\times10^{12}$ Ω, when the human body is brought into contact with the capping member and static electricity charged in the human body is discharged to the vehicle side, a discharge shock is not imparted to the hand or fingers, and secondary spark discharge does not occur since the amount of residual discharge after the discharge becomes that of a critical value of spark discharge.

In the invention according to the second aspect, since the capping member and the elongated coupling member are coupled to each other by the fastening member, and the members are respectively formed of the first electroconductive resin, the second electroconductive resin, and the third electroconductive resin, the string-attached cap can be maintained at the same potential as that of the vehicle body.

Since the first electroconductive resin and the second electroconductive resin are formed such that surface resistance from the capping member to the vehicle is set to be greater than or equal to $1\times10^{12}$ Ω and less than $5.30\times10^{12}$ Ω, when discharge of static electricity is allowed to take place in the same way as in the invention according to the first aspect, advantages are obtained in that no discharge shock is imparted to the human body, and that the secondary spark discharge does not occur after the discharge.

In addition, since, when the capping member is opened or closed, relative movement takes place at the portion where the capping member and the coupling member are coupled to each other, advantages can also be obtained in that the deformation of the coupling member can be held down to a small level, and that the opening and closing of the capping member can be effected smoothly.

In the invention according to the third aspect, the ring member is engaged in the outer periphery of the capping member, the ring member and the elongated coupling member are coupled to each other by the fastening member, and the members are respectively formed of the first electroconductive resin, the second electroconductive resin, and the third electroconductive resin, and the fourth electroconductive resin. Therefore, the string-attached cap can be maintained at the same potential as that of the vehicle body.

Since the first electroconductive resin, the second electroconductive resin, the third electroconductive resin, and the fourth electroconductive resin are formed such that surface resistance from the capping member to the vehicle is set to be greater than or equal to $1 \times 10^{12}$ $\Omega$ and less than $5.30 \times 10^{12}$ $\Omega$, when discharge of static electricity is allowed to take place in the same way as in the above-described invention, advantages are obtained in that no shock is imparted to the human body, and that the secondary spark discharge due to the amount of residual charge does not occur.

In addition, since the capping member can be rotated freely with respect to the ring member, advantages can be obtained in that when the capping member is opened or closed, the deformation of the coupling member can be held down to a small level, and that opening and closing can be effected smoothly.

In the invention according to the fourth aspect, the annular groove is formed in the outer periphery of the capping member, the elongated coupling member has the ring part formed integrally at one end thereof, the engaging part formed integrally with the inner periphery of the ring part is rotatably engaged in the annular groove of the capping member and is coupled to the capping member, and the members are respectively formed of the first electroconductive resin and the second electroconductive resin. Therefore, the string-attached cap can be maintained at the same potential as that of the vehicle body.

Since the first electroconductive resin and the second electroconductive resin are respectively formed such that surface resistance from the capping member to the vehicle is set to be greater than or equal to $1 \times 10^{12}$ $\Omega$ and less than $5.30 \times 10^{12}$ $\Omega$, when discharge of static electricity is allowed to take place in the same way as in the above-described invention, advantages are obtained in that no shock is imparted to the human body, and that the secondary spark discharge does not occur after the discharge.

In addition, since the capping member can be rotated freely with respect to the ring member of the coupling member, when the capping member is opened or closed, the deformation of the coupling member can be held down to a small level, and opening and closing can be effected smoothly.

In the assembling process in which the coupling member is attached to the capping member, since the coupling member is flexible, if the capping member is inserted into the ring part of the coupling member, the engaging part at the inner periphery of the ring part is elastically deformed, and if, in this state, the capping member is pushed in up to the annular groove, the engaging part is restored to its original state and is engaged in the annular groove. Therefore, the number of assembling steps can be substantially reduced as compared with the conventional art.

In the invention according to the fifth aspect, since the electroconductive resin is formed by mixing carbon powder, carbon fibers, or metal fibers with an insulating polymer, it is possible to increase the strength of the coupling member while obtaining predetermined surface resistance.

In the invention according to the sixth aspect, since an insulating polymer of a block copolymer including a hard segment and a soft segment containing a polyether component is used as the insulating polymer for forming the coupling member, advantages are obtained in that high bending properties are obtained even at a low temperature, and the coupling member does not become damaged due to fatigue caused by repeated deformation accompanying the opening and closing of the capping member.

In the invention according to the seventh aspect, the content of the carbon powder being set in a range of from 4% to 9% as weight percentage for the first electroconductive resin and in a range of from 3% to 5% as weight percentage for the second electroconductive resin, and a combination in which the content thereof in the first electroconductive resin is 9% and the content thereof in the second electroconductive resin is 5% as well as combinations in which the content thereof in the first electroconductive resin is in a range of from 4% to 5% and the content thereof in the second electroconductive resin is in a range of from 3% to 4% are excluded. Therefore, the surface resistance from the capping member to the vehicle can be set to be greater than or equal to $1 \times 10^{12}$ $\Omega$ and less than $5.30 \times 10^{12}$ $\Omega$.

In the invention according to the eighth aspect, since the electroconductive resin for forming each of the members is formed by mixing carbon powder, carbon fibers, or metal fibers with an insulating polymer, it is possible to increase the strength of the members.

In particular, since an insulating polymer of a block copolymer including a hard segment and a soft segment containing a polyether component is used as the insulating polymer for the second electroconductive resin for forming the coupling member, it is possible to obtain a coupling member which is flexible, maintains high bending properties even at a low temperature, and does not become damaged due to fatigue caused by repeated deformation accompanying the opening and closing of the capping member.

In the invention according to the ninth aspect, in the same way as the eighth aspect, since the electroconductive resin for forming each of the members is formed by mixing carbon powder, carbon fibers, or metal fibers with an insulating polymer, it is possible to increase the strength of the members.

Since an insulating polymer of a block copolymer including a hard segment and a soft segment containing a polyether component is used for the second electroconductive resin for forming the coupling member, it is possible to obtain a coupling member which is flexible, maintains sufficient bending properties even at a low temperature, and does not become damaged due to fatigue caused by repeated deformation accompanying the opening and closing of the capping member.

In the invention according to the tenth aspect, in the same way as the eighth or ninth aspect, since the electroconductive resin for forming each of the members is formed by mixing carbon powder, carbon fibers, or metal fibers with an insulating polymer, it is possible to increase the strength of the members. Since an insulating polymer of a block copolymer including a hard segment and a soft segment containing a polyether component is used for the second electroconductive resin for forming the coupling member, it is possible to obtain a coupling member which is flexible, maintains sufficient bending properties even at a low temperature, and does not become damaged due to fatigue caused by repeated deformation accompanying the opening and closing of the capping member.

In the invention according to the eleventh aspect, in the same way as the eighth to tenth aspects, since the electroconductive resin for forming each of the members is formed by mixing carbon powder, carbon fibers, or metal fibers with an insulating polymer, it is possible to increase the strength of the members. Since an insulating polymer of a block copolymer including a hard segment and a soft segment containing a polyether component is used for the second electroconductive resin for forming the coupling member, it is possible to obtain a coupling member which is flexible, maintains sufficient bending properties even at a low temperature, and does not become damaged due to fatigue caused by repeated deformation accompanying the opening and closing of the capping member.

The features and advantages of the present invention will be described in such a manner as to be apparent from the following detailed description and the accompanying drawings.

BRIEF DESCRIPTION OF THE DRAWINGS

In the accompanying drawings:

FIG. 6 is a diagram illustrating a change over time of the amount of residual charge;

FIG. 7 is a diagram illustrating the relationship among the carbon contents, surface resistance, the amount of residual charge, and the organoleptic evaluation;

DETAILED DESCRIPTION OF THE PREFERRED EMBODIMENTS

Figure 1:
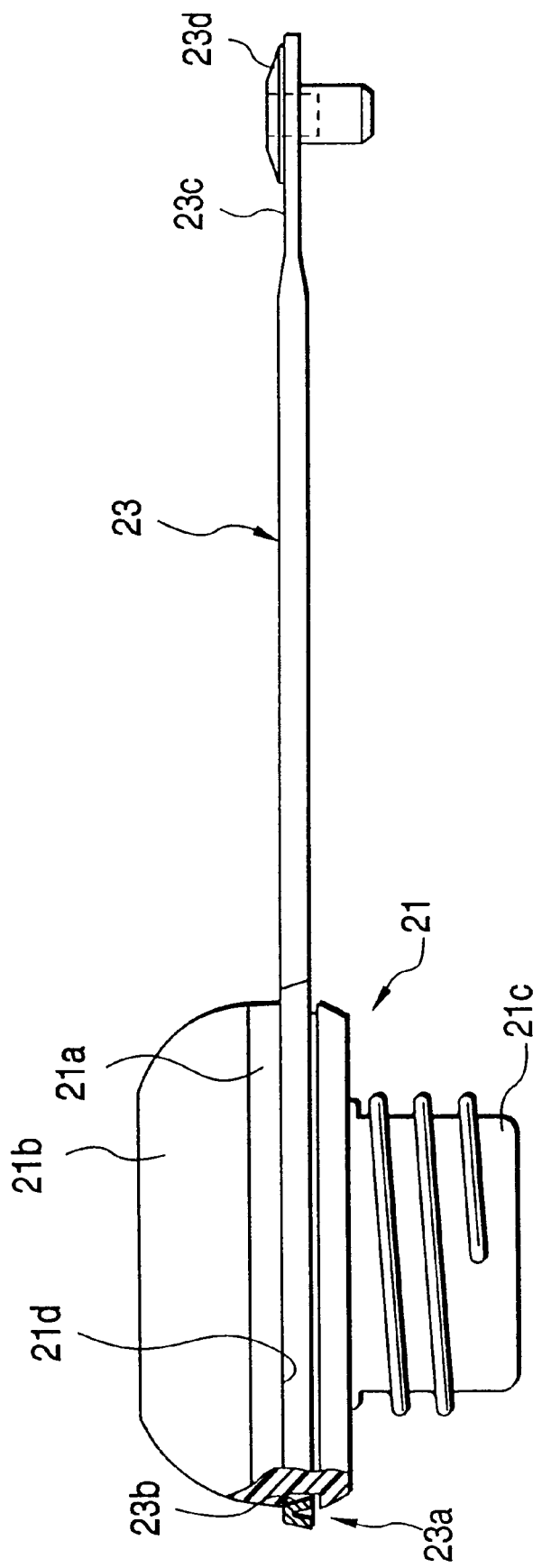
FIG. 1 is a side view illustrating the arrangement of a first embodiment.
Figure 2:
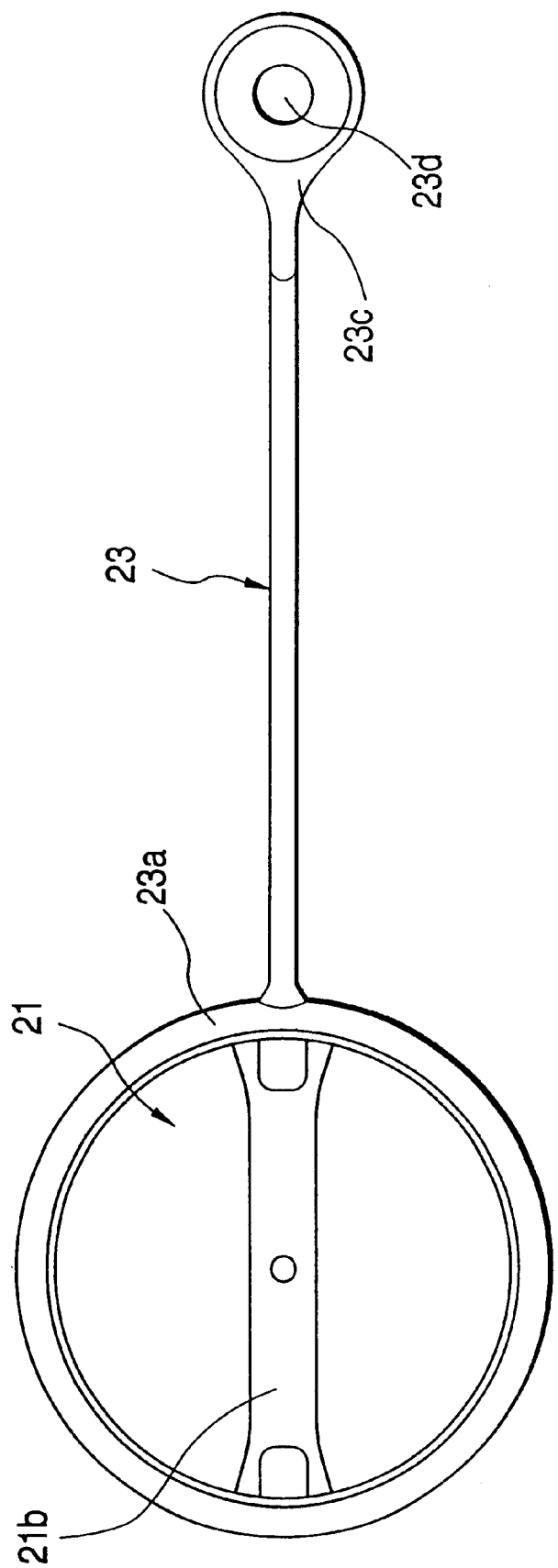
FIG. 2 is a top view illustrating the arrangement of the first embodiment.

FIGS. 1 and 2 show a first embodiment of the string-attached cap in accordance with the present invention. FIG. 1 is a side view, and FIG. 2 is a top view. In the drawings reference numeral 21 denotes a cap for a fuel tank of an automobile.

This cap 21 is formed of an electroconductive resin, and a handle portion 21b is formed on one side of a cap body 21a, and a threaded part 21c on the other side thereof.

An annular groove 21d is formed in the outer periphery of the cap body 21a.

Reference numeral 23 denotes an elongated flexible coupling member formed of an electroconductive resin. An annular ring part 23a is formed integrally at one end of the coupling member 23.

Figure 3:
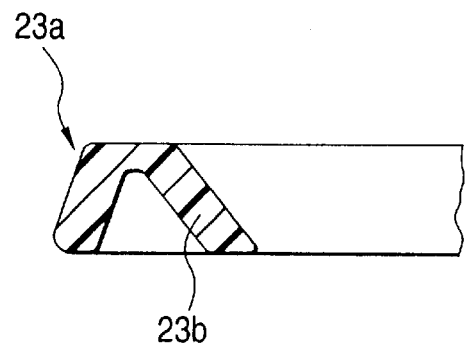
FIG. 3 is a cross-sectional view illustrating the arrangement of a ring part.

As shown in FIG. 3, this ring part 23a in its cross-sectional shape is formed in an inverse V-shape, and its inner peripheral side is formed as an engaging part 23b.

This engaging part 23b is rotatably engaged in the annular groove 21d formed in the outer periphery of the cap body 21a.

It should be noted that an attaching portion 23c is formed integrally at the other end of the coupling member 23, and an attaching member 23d for attachment to the vehicle is formed in this attaching portion 23c.

In the above-described string-attached cap, if the cap body 21a is inserted into the ring part 23a of the coupling member 23, the engaging part 23b at the inner periphery of the ring part 23a is elastically deformed and its diameter is enlarged. If, in this diameter-enlarged and deformed state, the cap body 21a is further pushed in up to the annular groove 21d, the engaging part 23b is restored to its original state and is engaged in the annular groove 21d.

Figure 4:
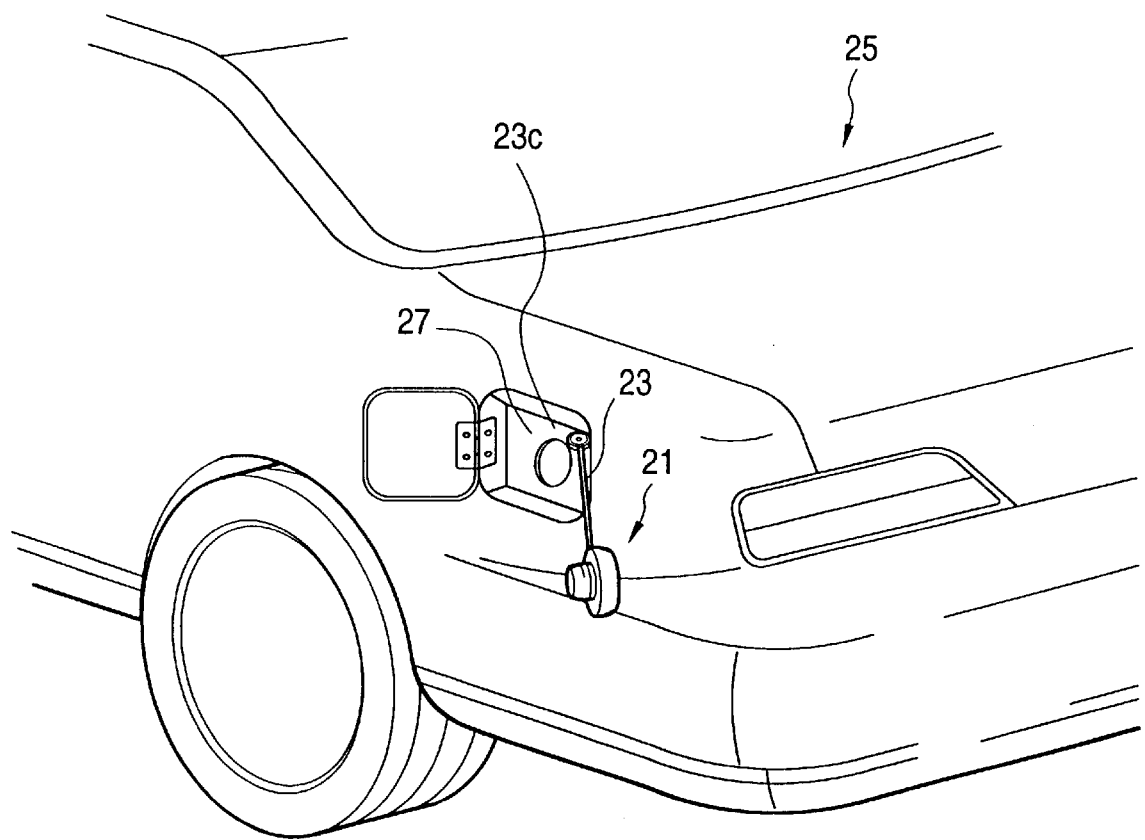
FIG. 4 is a perspective view illustrating a state in which the string-attached cap is disposed on a vehicle body.

As shown in FIG. 4, the string-attached cap thus constructed is used as the attaching portion 23c formed at the other end of the coupling member 23 is rotatably fixed to a vehicle body 27 of an automobile 25 by means of the attaching member 23d.

In this embodiment, the electroconductive resin for forming the cap 21 and the coupling member 23 is formed by mixing carbon powder (carbon black) into a flexible insulating polymer.

The content of the carbon powder to be mixed in is determined such that when the human body charged with static electricity comes into contact with the handle portion 21b, no shock is imparted to the hand or fingers, and secondary spark discharge does is not caused by the amount of residual charge. To determine this content, the amount of residual charge was measured by conducting an organoleptic evaluation in a number of combinations by varying the respective contents in the cap 21 and the coupling member 23.

Figure 5:
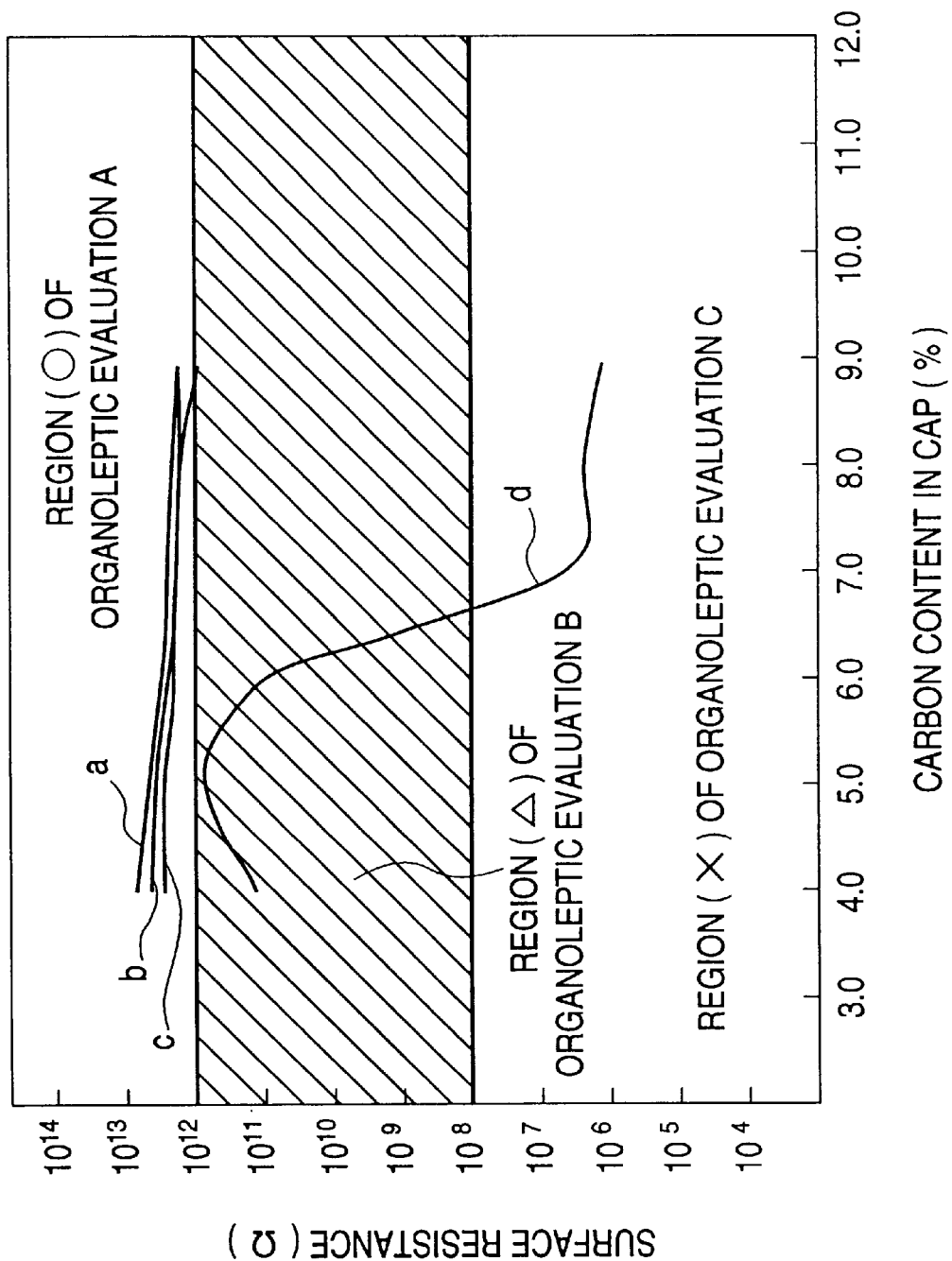
FIG. 5 is a diagram illustrating results of surface resistance measured by varying the carbon contents in a coupling member and the cap, as well as an organoleptic evaluation.

FIG. 5 is a diagram illustrating the results of surface resistance and organoleptic evaluation measured by varying the content of carbon powder in the coupling member 23 and the cap 21. Curves a, b, c, and d respectively show surface resistance values measured by varying its content in the cap 21 from 4% to 9% when its content (weight ratio) in the coupling member 23 was set to 3%, 4%, 5%, and 6%.

The organoleptic evaluation was conducted with respect to combinations of the contents at three levels, including A in which no shock is felt, B in which a slight shock is felt, and C in which a strong shock is felt. Consequently, as shown in FIG. 5, in the region where the surface resistance was $10^8$ Ω or less, a strong shock at C level (X) was felt. Meanwhile, in the region from $10^8$ Ω to $10^{12}$ Ω, the level was B level (Δ), and in only the region higher than or equal to $10^{12}$ Ω, the level was A level (○) in which no shock was felt. Accordingly, in order not to feel a shock, it is necessary to render the surface resistance higher than or equal to $10^{12}$ Ω.

On the other hand, if the surface resistance is large, the discharge of static electricity becomes difficult, and static electricity remains even after the discharge. If the amount of this residual charge is large, the risk of secondary spark discharge occurs. Accordingly, an experiment on discharge was conducted in a combination 1 in which the content in the cap 21 was set to 4% and the content in the coupling member 23 was set to 3%, a combination 2 in which the content in the cap 21 was set to 5% and the content in the coupling member 23 was set to 4%, and a combination 3 in which the content in the cap 21 was set to 9% and the content in the coupling member 23 was set to 6%. The condition of discharge was that the human body charged with 9.0 kV static electricity touches the handle 21b for two seconds.

FIG. 6 is a diagram illustrating a change over time of the amount of residual charge. Curves e, f, and g, are discharge curves showing the amounts of residual charge in the combination 1, combination 2, and combination 3, respectively.

According to FIG. 6, in the combinations 1 and 2, the amount of residual charge stabilized at 2.5 kV and 2.0 kV, respectively, after the lapse of 0.4 second upon touching, as shown by the curves e and f. In the combination 3, the amount of residual charge was 0 after the lapse of 0.16 second at shown by the curve g. Since the critical voltage of the spark discharge in the air is 2 kV (referring to "safety guide for static electricity" published by Technology Institution of Industrial Safety in Japan, 1988), if the surface resistance is set to a level less than or equal to that of the combination 2 in which the amount of residual charge stabilizes at 2.0 kV, the amount of residual charge becomes 2.0 kv or less, so that the secondary spark charge becomes difficult to occur. The surface resistance of the combination 2 is $5.30 \times 10^{12}$ Ω.

FIG. 7 is a diagram which shows the relationship among the carbon contents, surface resistance, the amount of residual charge, and the organoleptic evaluation.

In combinations in which the carbon powder content of the cap 21 is in the range of from 4% to 5% and the carbon powder content of the coupling member 23 is in the range of from 3% to 4%, the amount of residual charge becomes 2.0 kV or more, and there is the risk of secondary discharge, so that such cases are excluded from the combinations of the contents.

On the other hand, in combinations in which the content in the coupling member 23 is 6% and the content in the cap 21 is in the range of from 4% to 9% and in combinations in which the content in the coupling member 23 is 5% and the content in the cap 21 is 9%, since the surface resistance is less than $10^{12}$ Ω, a shock is imparted when the human body touches the handle portion 21b, so that these combinations are not used, either.

In combinations in which the content in the coupling member 23 is in the range of from 3% to 4% and the content in the cap 21 is in the range of from 6% to 9% or in combinations in which the content in the coupling member 23 is 5% and the content in the cap 21 is in the range of from 4% to 8%, since no shock is imparted to the human body at the time of discharging static electricity, and the amount of residual charge does not cause the secondary spark discharge. Therefore, these ranges are set as the ranges of carbon powder contents in the cap 21 and the coupling member 23 in accordance with this embodiment.

As the insulating polymer which is mixed with the carbon powder, it is possible to cite a polyamide such as nylon 66, a polyamide elastomer, polyester, a polyester elastomer, and the like.

Among others, as the material for forming the coupling member 23, a material having high bending resistance is selected. Thus, it is possible to obtain a coupling member 23 which is flexible, maintains high bending properties even at a low temperature, and does not become damaged due to fatigue caused by repeated deformation accompanying the opening and closing of the cap 21.

As one example of a polymer which meets this bending resistance, it is desirable to use a polyester elastomer constituted by a block copolymer of a hard segment and a soft segment which respectively have the structures shown below (tradename: "HYTREL" made by DUPONT-TORAY CO., LTD.). The point to be noted in this block copolymer is that the soft segment contains a polyether component.

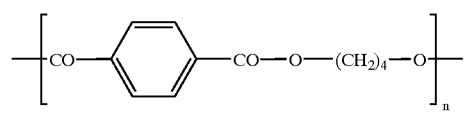

Hard Segment

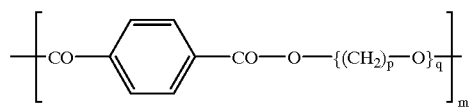

Soft Segment

Ester linkage is used as the basic structure of the hard segment and the soft segment, but the present invention is not limited to the same, and amide linkage may be adopted as the basic structure of the two segments. In this case as well, the soft segment should desirably contain a polyether component.

In general, due to the mixing in of carbon powder, the flexible polymer has the tendency of becoming hard and brittle, so that the mixing in of carbon powder is not desirable for the coupling member. However, since the aforementioned resin is adopted, even if carbon powder is mixed in, it is possible to obtain sufficient bending resistance.

In addition, as for the electroconductive resin for forming the cap 21 and the coupling member 23, resins of the same type or different types may be adopted.

In the string-attached cap constructed as described above, since the cap 21 and the coupling member 23 are formed of flexible electroconductive resin, static electricity occurring in the cap 21 and the coupling member 23 is allowed to gradually escape to the vehicle body side through the coupling member 23, with the result that it is possible to easily and positively prevent the cap 21 and the coupling member 23 from becoming electrically charged.

In addition, as the human body charged with static electricity touches the cap 21 during re-fueling, it is possible to allow the static electricity to escape to the vehicle body side without feeling a shock before opening the cap. In addition, even if the human body touches the opened cap again, the secondary spark discharge does not occur.

In the above-described string-attached cap, since the ring part 23a of the coupling member 23 is inserted and fitted in the annular groove 21d formed in the cap body 21a, the coupling member 23 does not constitute an obstruction when the cap 21 is turned while gripping the handle portion 21b. In addition, the cap 21 is freely rotatable with respect to the ring part 23a, so that the coupling member 23 does not constitute an obstruction.

Since the coupling member 23 has high bending resistance, even if the cap 21 is opened and closed repeatedly, the coupling member 23 does not become damaged due to fatigue.

Further, if the cap body 21a is inserted into the ring part 23a of the coupling member 23, the engaging part 23b at the inner periphery of the ring part 23a is elastically deformed, and if, in this state, the cap body 21a is merely pushed in up to the annular groove 21d, the engaging part 23b is restored to its original state and is engaged in the annular groove 21d. Therefore, the number of assembling steps can be substantially reduced as compared with the conventional art.

In addition, in the above-described string-attached cap, since the cross section of the ring part 23a is formed in a V-shape, and the inner periphery is formed as the engaging part 23b, it is possible to allow the elastic deformation of the engaging part 23b to take place easily and positively when the coupling member 23 is attached to the cap 21.

In this embodiment, the cap 21 constitutes a capping member, and the electroconductive resin for forming the cap 21 constitutes a first electroconductive resin.

The electroconductive resin for forming the coupling member 23 constitutes a second electroconductive resin.

Next, a description will be given of a second embodiment.

Figure 8:
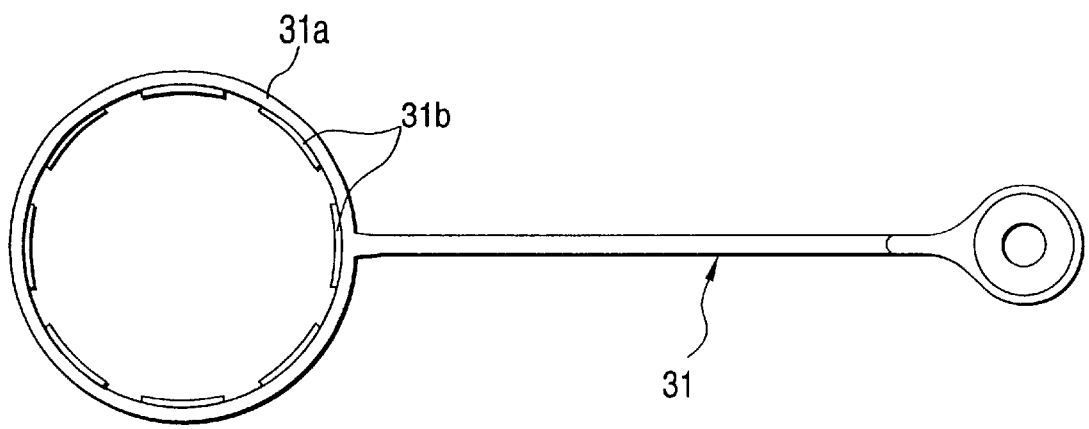
FIG. 8 is a top view of the coupling member illustrating the arrangement of a second embodiment.
Figure 9:
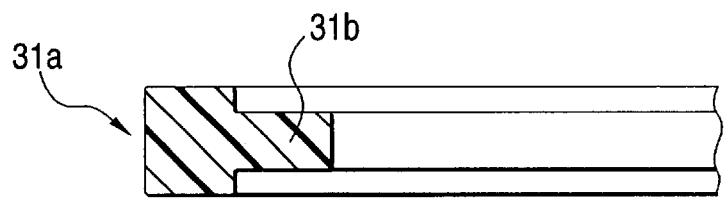
FIG. 9 is a cross-sectional view illustrating the arrangement of a ring part of the coupling member.

FIG. 8 is a top view illustrating a coupling member, and FIG. 9 is a cross-sectional view of a ring part of the coupling member. In this embodiment, as shown in FIG. 8, a coupling member 31 is formed such that its engaging part is formed by a plurality of protrusions 31b which protrude inwardly from a ring part 31a at predetermined angles. This coupling member 31 is formed of an electroconductive resin which contains carbon powder with the same content as that for the coupling member 23 in accordance with the first embodiment.

If the cap body 21a (see FIG. 1) is inserted into the ring part 31a, the protruding portions 31b serving as the engaging part are elastically deformed in a direction away from the inserting side. If, in this state, the cap body 21a is pushed in up to the annular groove 21d, the protrusions 31b are restored to their original state and are engaged in the annular groove 21d.

The other arrangements, including the compositions of the electroconductive resins and carbon contents for the cap and the like, are similar to those of the first embodiment.

Thus, since the surface resistance between the cap 21 and the coupling member 31 becomes similar to that of the first embodiment, so that advantages similar to those of the first embodiment can be obtained.

In addition, in this embodiment, since the engaging part is formed by the plurality of protrusions 31b which protrude inwardly from the ring part 31a at predetermined angles, the elastic deformation of the engaging part can be allowed to take place easily and positively in the same way as in the first embodiment.

The electroconductive resin for forming the coupling member 31 constitutes a second electroconductive resin.

Next, a description will be given of a third embodiment.

In this embodiment, the coupling member is provided with a further different arrangement.

Figure 10:
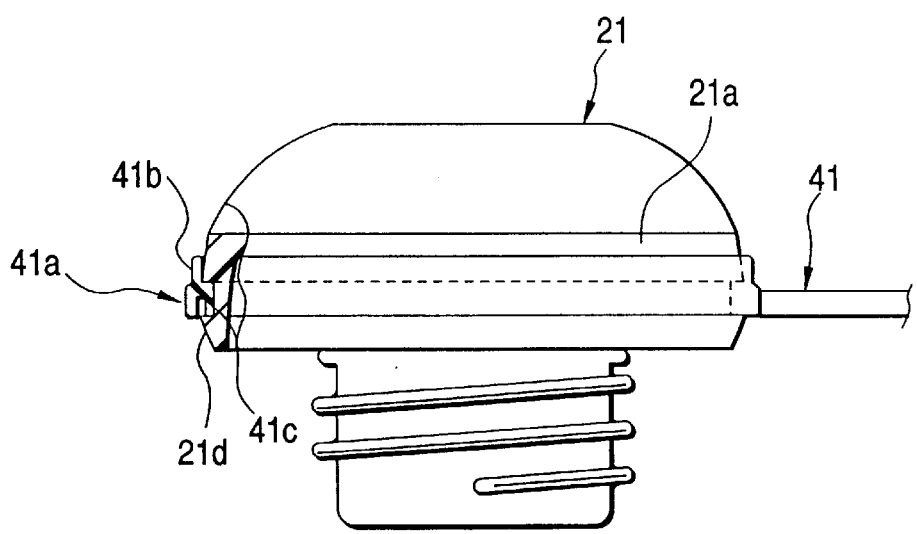
FIG. 10 is a side view illustrating the arrangement of a third embodiment.
Figure 11:
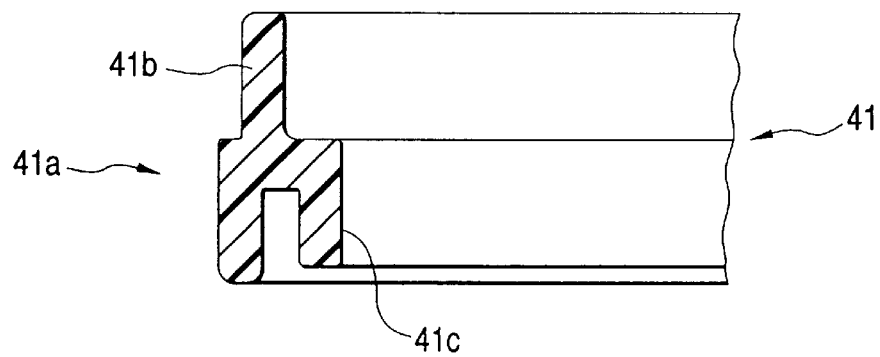
FIG. 11 is a cross-sectional view illustrating the arrangement of a ring part of the coupling member.

FIG. 10 is a side view of the third embodiment, and FIG. 11 is a cross-sectional view illustrating the arrangement of a ring part of the coupling member.

An annular protruding portion 41b protruding in the vicinity of the annular groove 21d at the outer periphery of the cap body 21a of the cap 21 is formed integrally with a ring part 41a of a coupling member 41. The annular protruding portion 41b and an engaging part 41c are formed in such a manner as to project in mutually opposite directions.

The cross section of the portion corresponding to the annular groove including the engaging part 41c is formed in a rectangular shape (U-shape).

Although not particularly illustrated, the attaching portion (23c) and the attaching member (23d) are provided at the other end of the coupling member 41 in the same way as the coupling member 23 in the first embodiment.

The coupling member 41 is formed of an electroconductive resin which contains carbon powder with the same content as that for the coupling member 23 in accordance with the first embodiment.

The other arrangements, including the compositions of the electroconductive resins and carbon contents for the cap and the like, are similar to those of the first embodiment.

In this embodiment as well, in the same way as in the first embodiment advantages can be obtained in that it is possible to allow the static electricity to be discharged without feeling a shock, and the secondary spark discharge does not occur after the discharge.

In addition, in this string-attached cap, when a force acts between the cap 21 and the coupling member 41, the annular protruding portion 41b abuts against the outer periphery of the cap 21, and the aforementioned force is alleviated by the annular protruding portion 41b, so that the force acting on the engaging part 41c becomes small. Consequently, the resilient deformation of the engaging part 41c becomes small, and the engaging part 41c is prevented from coming off the annular groove 21d. Further, since the force acting between the cap 21 and the coupling member 41 is dispersed to the annular protruding portion 41b and the engaging part 41c, an advantage can be obtained in that the rotation of the cap 21 becomes smooth.

Figure 12A:
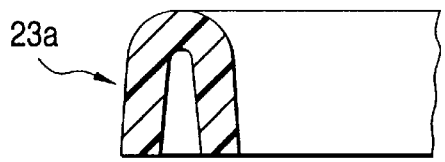
FIGS. 12A and FIG. 12B are diagrams illustrating other examples of the arrangement of the cross section of a portion corresponding to an annular groove.

It should be noted that although, in the above-described first embodiment, a description has been given of the example in which the cross section of the ring part 23a of the coupling member 23 is formed substantially in a V-shape, the present invention is not limited such an example, and the cross section of the ring part 23a of the coupling member 23 may be formed substantially in a U-shape, as shown in FIG. 12A.

Figure 12B:
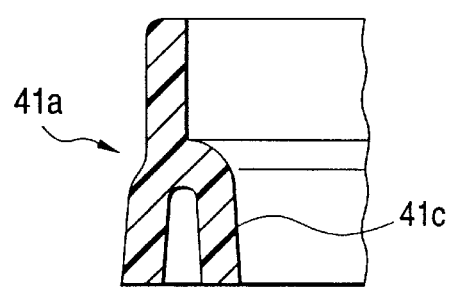

In addition, although, in the above-described third embodiment, a description has been given of the example in which the cross section of the ring part 41a of the coupling member 41 is formed in a rectangular shape, the present invention is not limited to such an example. For example, as shown in FIG. 12B, the cross section of the portion corresponding to the annular groove including the engaging part 41c may be formed substantially in a U-shape.

The electroconductive resin for forming the coupling member 41 constitutes the second electroconductive resin.

Next, a description will be given of a fourth embodiment.

Figure 13:
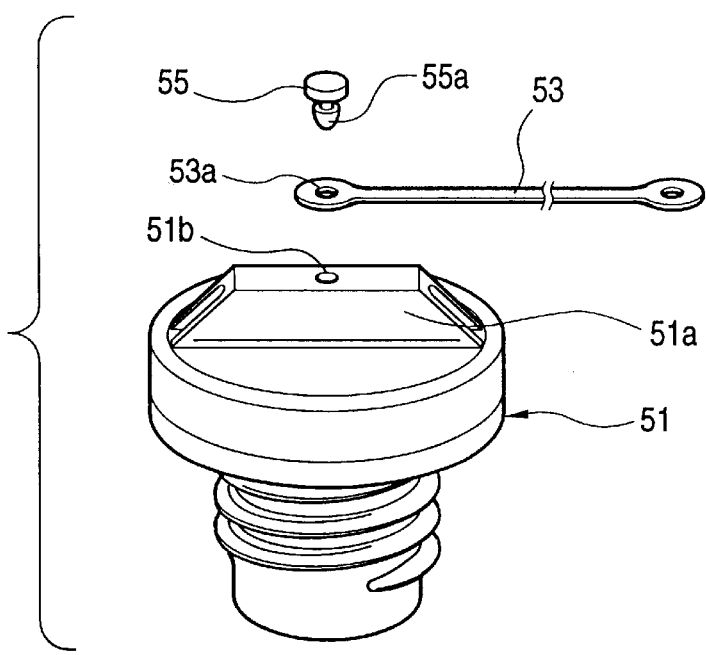
FIG. 13 is a perspective view illustrating a fourth embodiment.

FIG. 13 is a perspective view illustrating the arrangement of the fourth embodiment. In this embodiment, one end of a coupling member 53 is connected to a handle portion 51a of a cap 51 through a fastening member 55.

The cap 51 and the coupling member 53 are formed of electroconductive resins containing carbon powder with the same contents as those for the cap 21 and the coupling member 23 in accordance with the first embodiment, and the fastening member 55 is formed of the same electroconductive resin as that of the cap 51.

Figure 14:
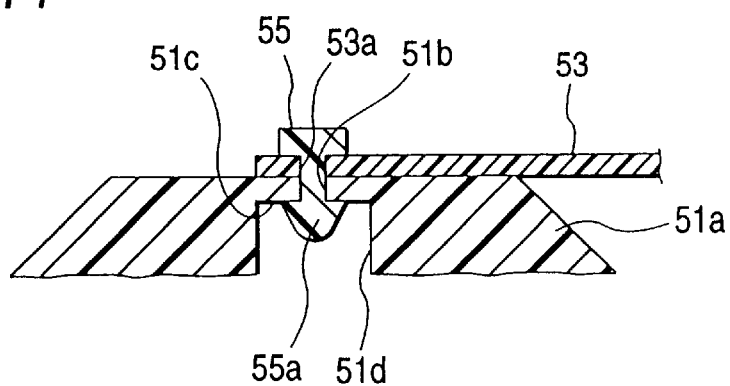
FIG. 14 is a cross-sectional view illustrating a state in which the coupling member is fastened to a handle portion.

FIG. 14 is a cross-sectional view illustrating a state in which the coupling member is fastened to the handle portion. An attaching hole 51b for insertion of a retaining portion 55a formed at a tip of the fastening member 55 is formed in the handle portion 51a of the cap 51, and a retaining hole 51d is formed via a stepped portion 51c.

In a state in which the retaining portion 55a of the fastening member 55 is inserted in a through hole 53a formed at one end of the coupling member 53, the retaining portion 55a is inserted in the attaching hole 51b in the handle portion 51a, thereby fastening the coupling member 53 to the handle portion 51a.

The other arrangements of the coupling member 53 are similar to those of the first embodiment.

In this embodiment, the cap 51 constitutes the capping member, and the electroconductive resin for forming the cap 51 constitutes the first electroconductive resin.

The electroconductive resin for forming the coupling member 53 constitutes the second electroconductive resin.

The electroconductive resin for forming the fastening member 55 constitutes a third electroconductive resin.

Next, a description will be given of a fifth embodiment.

Figure 15:
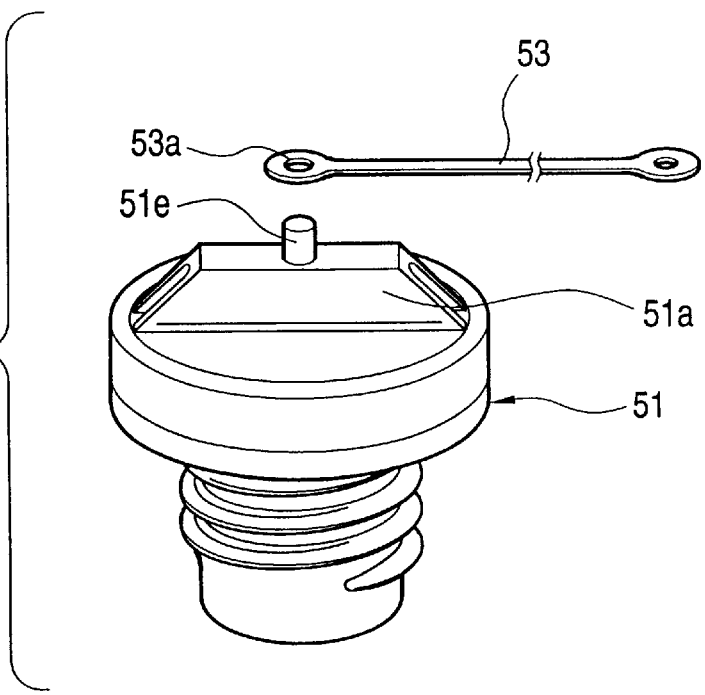
FIG. 15 is a perspective view illustrating a fifth embodiment.

FIG. 15 is a perspective view illustrating the arrangement of the fifth embodiment.

This embodiment differs from the fourth embodiment in that a fastening member 51e is formed integrally with the handle portion 51a of the cap 51.

This cap 51 is formed of an electroconductive resin containing carbon powder with the same content as that of the cap 21 in accordance with the first embodiment.

Figure 16:
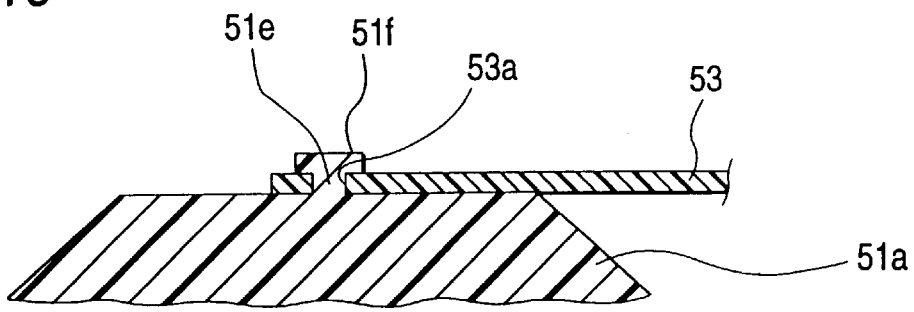
FIG. 16 is a cross-sectional view illustrating a state in which the coupling member is fastened to the handle portion.

In this embodiment, as shown in FIG. 16, in a state in which the fastening member 51e is fitted in the through hole 53a formed at one end of the coupling member 53, the diameter of a distal end of the fastening member 51 is enlarged by means of heat or ultrasonic waves so as to form a calked portion 51f, thereby fastening the coupling member 53 to the handle portion 51a.

In this embodiment, static electricity can be discharged without imparting a shock to the human body, and the secondary spark discharge can be prevented in the same way as in the fourth embodiment.

In this embodiment, the cap 51 constitutes the capping member, and the electroconductive resin for forming the cap 51 constitutes the first electroconductive resin.

The electroconductive resin for forming the fastening member 51e constitutes the third electroconductive resin.

Next, a description will be given of a sixth embodiment.

Figure 17:
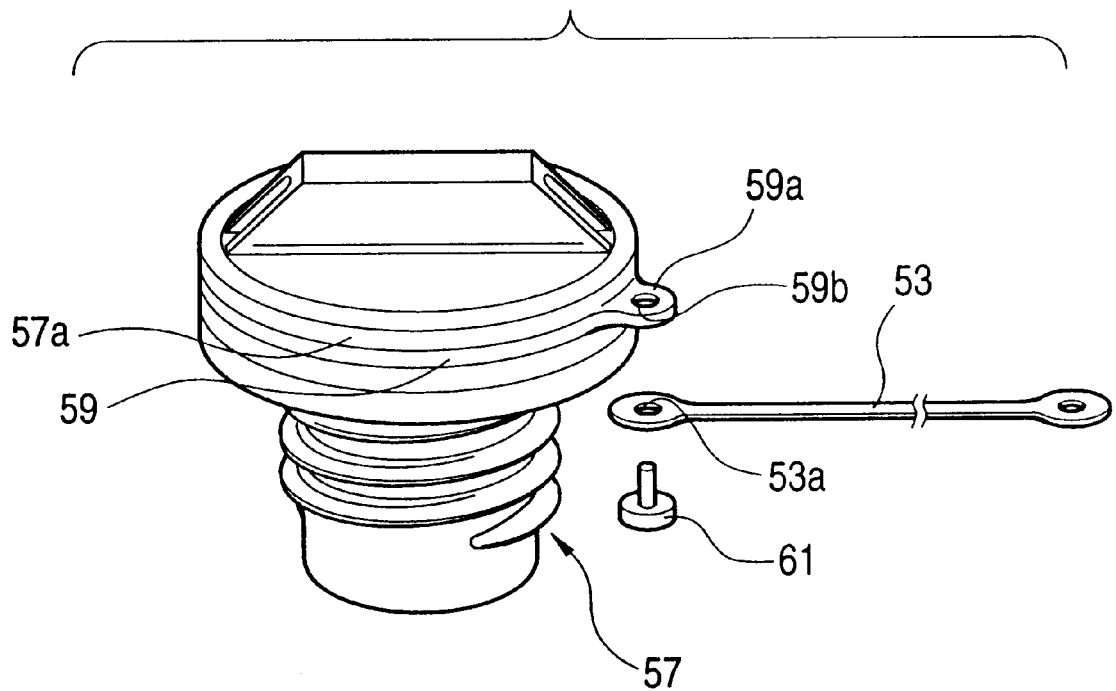
FIG. 17 is a perspective view illustrating a sixth embodiment.

FIG. 17 is a perspective view illustrating the arrangement of the sixth embodiment.

In this embodiment, a ring member 59 is rotatably engaged in the outer periphery of a cap body 57a of a cap 57. A projecting portion 59a projecting outwardly is formed on the ring member 59, and an attaching hole 59b is formed in this projecting portion 59a.

The cap 57 is formed of an electroconductive resin containing carbon powder with the same content as that of the cap 21 in accordance with the first embodiment.

The ring member 59 and a fastening member 61 are formed of the same electroconductive resin as that of the cap 57.

Figure 18:
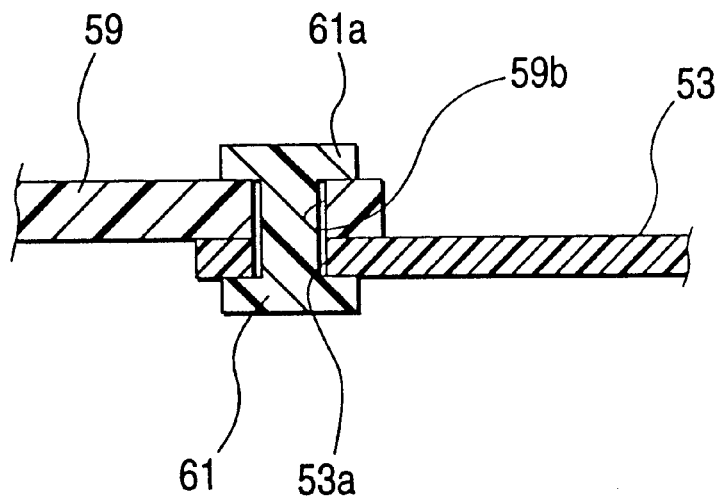
FIG. 18 is a cross-sectional view illustrating a state in which the coupling member is fastened to a ring member.

In the coupling between the coupling member 53 and the ring member 59, as shown in FIG. 18, in a state in which a tip portion of the rivet-like fastening member 61 is inserted in the through hole 53a formed at one end of the coupling member 53, the tip portion of the fastening member 61 is inserted in the attaching hole 59b of the ring member 59, and the diameter of the tip portion of the fastening member 61 is enlarged by means of heat or ultrasonic waves so as to form a calked portion 61a, thereby fastening the coupling member 53 to the ring member 59.

The other arrangements are similar to those of the first embodiment.

In the string-attached cap of this embodiment, in the same way as in the above-described embodiments, since the coupling member 53, the fastening member 61, and the ring member 59 are formed of electroconductive resin containing carbon powder having predetermined contents, it is possible to discharge static electricity without imparting a shock to the human body, and the secondary spark discharge due to the amount of residual charge does not occur after the discharge.

In this embodiment, the cap 57 constitutes the capping member, and the electroconductive resin for forming the cap 57 constitutes the first electroconductive resin.

The electroconductive resin for forming the coupling member 53 constitutes the second electroconductive resin.

The electroconductive resin for forming the fastening member 61 constitutes the third electroconductive resin.

The electroconductive resin for forming the ring part constitutes a fourth electroconductive resin.

Next, a description will be given of a seventh embodiment.

Figure 19:
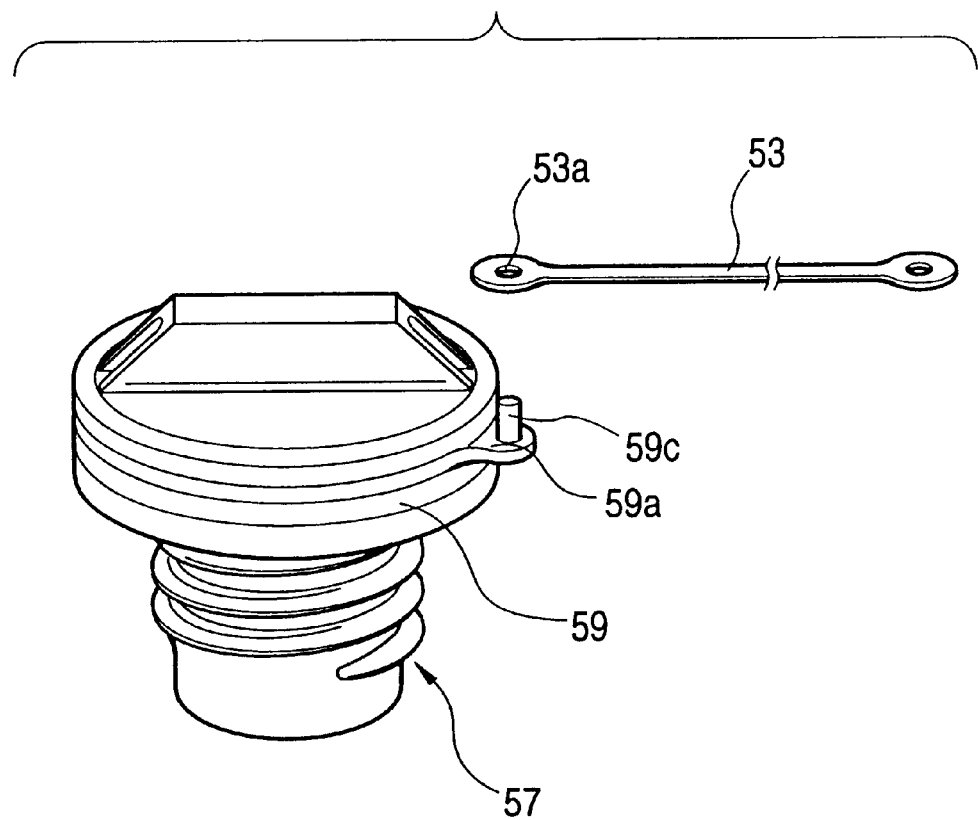
FIG. 19 is a perspective view illustrating a seventh embodiment.

FIG. 19 is a perspective view illustrating the arrangement of the seventh embodiment. This embodiment differs from the sixth embodiment in that a fastening member 59c is formed integrally with the projecting portion 59a of the ring member 59.

This ring member 59 is formed of the same electroconductive resin as that of the cap 57.

Figure 20:
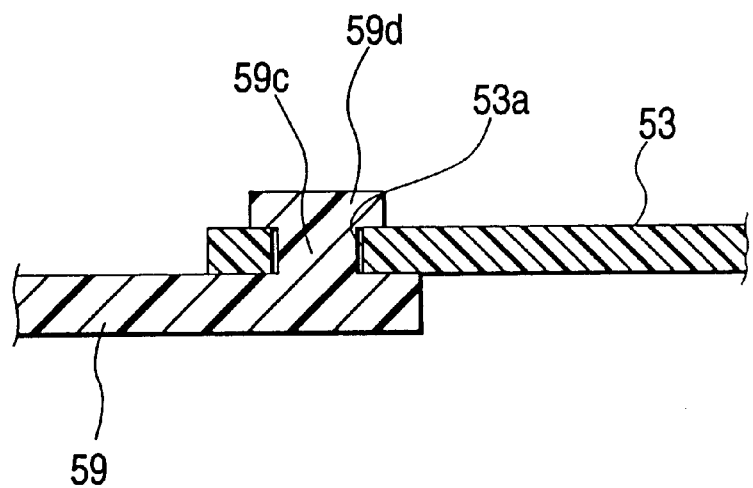
FIG. 20 is a cross-sectional view illustrating a state in which the coupling member is fastened to the ring member.
Figure 21:
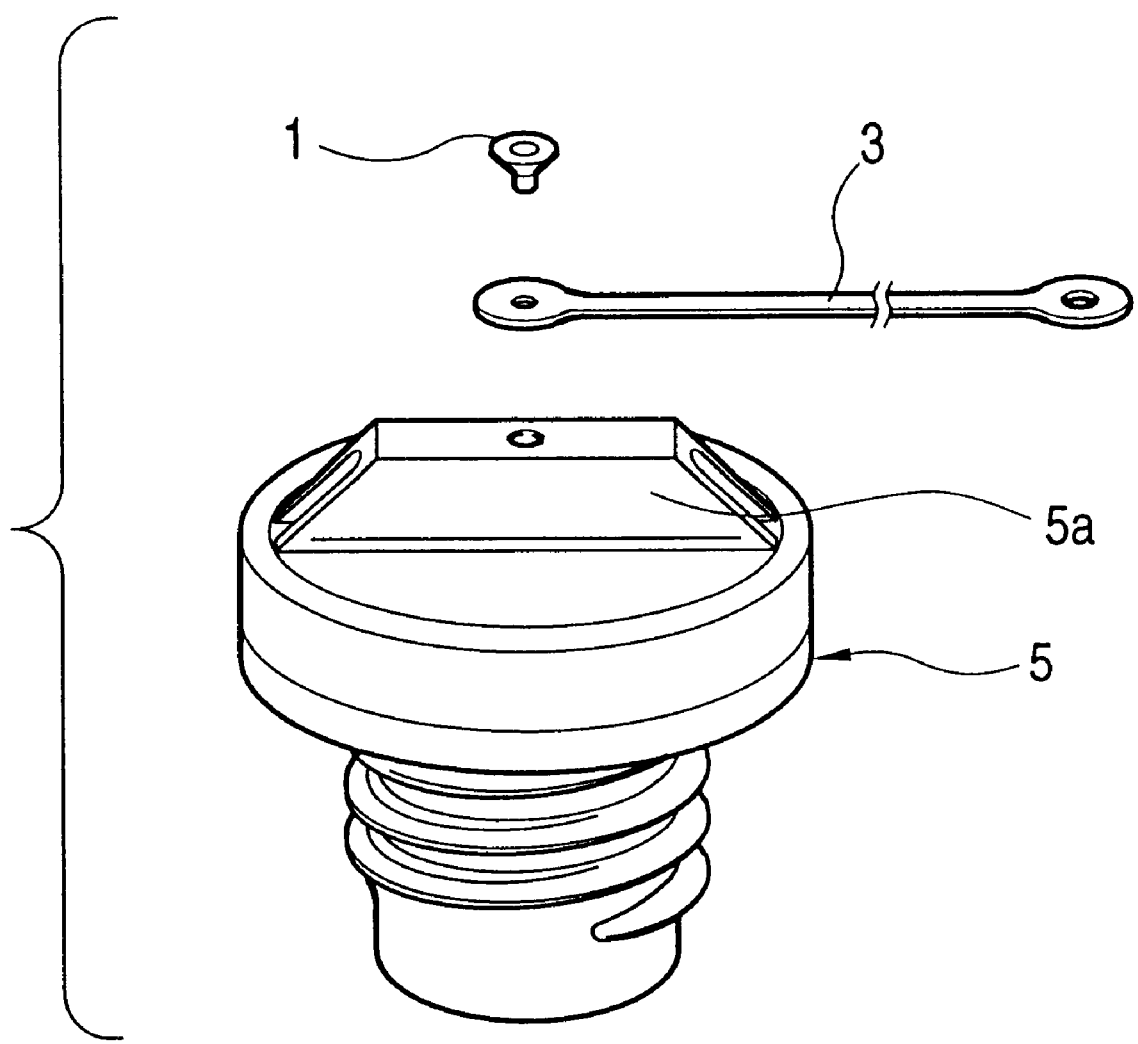
FIG. 21 is a perspective view illustrating a conventional string-attached cap.
Figure 22:
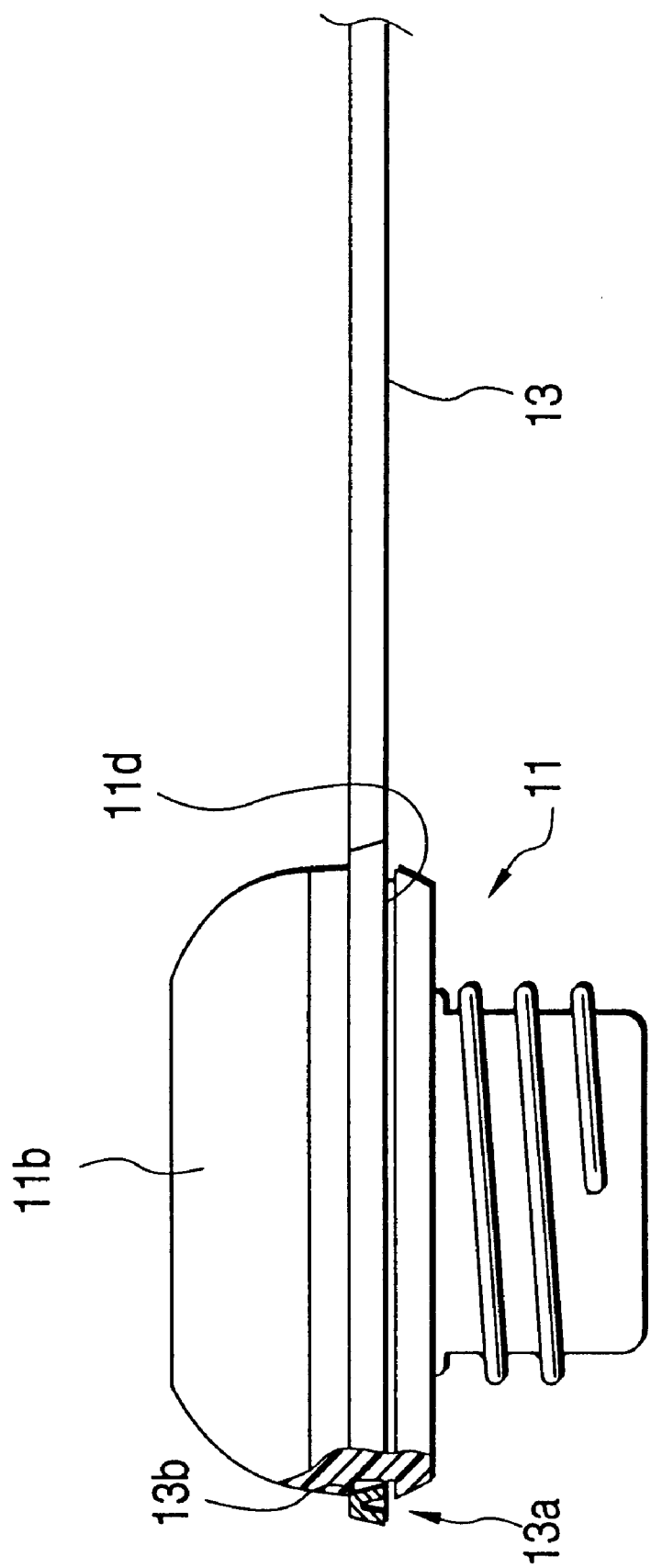
FIG. 22 is a side view illustrating another conventional string-attached cap.

In this embodiment, as shown in FIG. 20, in a state in which the fastening member 59c is fitted in the through hole 53a formed at one end of the coupling member 53, the diameter of a distal end of the fastening member 59c is enlarged by means of heat or ultrasonic waves so as to form a calked portion 59d, thereby fastening the coupling member 53 to the ring part 59.

The other arrangements, including the compositions of the electroconductive resins, are similar to those of the sixth embodiment.

With the string-attached cap in accordance with this embodiment as well, it is possible to obtain advantages similar to those of the sixth embodiment.

In this embodiment, the electroconductive resin for forming the fastening member 59c constitutes the third electroconductive resin.

The electroconductive resin for forming the ring member 59 constitutes the fourth electroconductive resin.

It should be noted that although, in the foregoing embodiments, a description has been given of the example in which the electroconductive resin is formed by mixing carbon powder into an insulating polymer, the present invention is not limited such an embodiment. For example, the electroconductive resin may be formed by mixing metal fibers such as stainless steel fibers and copper fibers, or metal powders, carbon fibers, or the like.

Although, in the foregoing embodiments, a description has been given of the preferred forms of the present application, it goes without saying that modifications and applications are possible without departing from the gist of the present application.

As described above, with the string-attached cap in accordance with the present invention, since the electroconductive resin for forming each member of the string-attached cap is formed by mixing carbon powder, carbon fibers, or metal fibers with an insulating polymer, it is possible to increase the strength of the coupling member. In particular, since an insulating polymer of a block copolymer including a hard segment and a soft segment containing a polyether component is used as the insulating polymer for the second electroconductive resin for forming the coupling member, the coupling member is flexible and maintains high bending properties even at a low temperature, and does not become damaged due to fatigue caused by repeated deformation accompanying the opening and closing of the capping member. Therefore, the service life of the string-attached cap can be prolonged.

In addition, as for the coupling between the capping member and the coupling member, in a case where an arrangement is provided such that an annular groove is formed in the capping member, and the ring part of the coupling member is fitted and inserted in the annular groove, the coupling member does not constitute an obstruction when the capping member is turned. In the assembling process in which the coupling member is fitted to the capping member, if the capping member is inserted into the ring part of the coupling member, the engaging part at the inner periphery of the ring part is elastically deformed. Therefore, if, in this state, the capping member is pushed in, the engaging part is restored to its original state and is engaged in the annular groove. Therefore, the number of assembling steps can be substantially reduced as compared with the conventional art.

Since the surface resistance from the capping member to the vehicle is set in the range greater than or equal to $1 \times 10^{12}$ Ω and less than $5.30 \times 10^{12}$ Ω, the capping member can be maintained at the same potential as that of the vehicle body. At the same time, when the human body is brought into contact with the capping member, static electricity charged in the human body passes through the coupling member and is allowed to escape to the vehicle body side without imparting a shock to the human body. In addition, it is possible to prevent the occurrence of secondary spark discharge due to the amount of residual charge.

In addition, the arrangement provided is such that the content of the carbon powder being set in a range of from 4% to 9% as weight percentage for the first electroconductive resin and in a range of from 3% to 5% as weight percentage for the second electroconductive resin, and a combination in which the content thereof in the first electroconductive resin is 9% and the content thereof in the second electroconductive resin is 5% as well as combinations in which the content thereof in the first electroconductive resin is in a range of from 4% to 5% and the content thereof in the second electroconductive resin is in a range of from 3% to 4% are excluded. Therefore, the surface resistance from the capping member to the vehicle can be set to be greater than or equal to $1 \times 10^{12}$ Ω and less than $5.30 \times 10^{12}$ Ω.

What is claimed is:

1. A string-attached cap comprising:
   a capping member formed of a first electroconductive resin; and
   an elongated coupling member having one end connected to said capping member, said elongated coupling member being formed of a second electroconductive resin and being flexible, and said string-attached cap being used with another end of said coupling member coupled to a vehicle,
   wherein said first electroconductive resins and said second electroconductive resin are formed such that surface resistance from said capping member to said vehicle is set to be greater than or equal to $1 \times 10^{12}$ Ω and less than $5.30 \times 10^{12}$ Ω.

2. A string-attached cap according to claim 1, wherein all of said electroconductive resins are each formed of a mixture of an insulating polymer and one of carbon powders, carbon fibers and metal fibers.

3. A string-attached cap according to claim 2, wherein said second electroconductive resin for forming said coupling member has its insulating component consisting of an insulating polymer of a block copolymer including a hard segment and a soft segment, said soft segment containing a polyether component.

4. A string-attached cap according to claim 2, wherein said first electroconductive resin for forming said capping member and said second electroconductive resin for forming said coupling member are each formed of a mixture of an insulating polymer and carbon powder, a content of said carbon powder being set in a range of from 4% to 9% as weight percentage for said first electroconductive resin and in a range of from 3% to 5% as weight percentage for said second electroconductive resin, a combination in which the content thereof in said first electroconductive resin is 9% and the content thereof in said second electroconductive resin is 5% as well as combinations in which the content thereof in said first electroconductive resin is in a range of from 4% to 5% and the content thereof in said second electroconductive resin is in a range of from 3% to 4% are being excluded.

5. A string attached cap according to claim 1, wherein said surface resistance is greater than $2.60 \times 10^{12}$ Ω and less than $5.30 \times 10^{12}$ Ω.

6. A string-attached cap comprising:
   a capping member formed of a first electroconductive resin;
   an elongated coupling member formed of a second electroconductive resin and being flexible; and
   a fastening member formed of a third electroconductive resin for fastening one end of said coupling member to said capping member, said string-attached cap being used with another end of said coupling member coupled to a vehicle, wherein said first electroconductive resins, said second electroconductive resin, and said third electroconductive resin are formed such that surface resistance from said capping member to said vehicle is set to be greater than or equal to $1 \times 10^{12}$ Ω and less than $5.30 \times 10^{12}$ Ω.

7. A string-attached cap according to claim 6, wherein all of said electroconductive resins are each formed of a mixture of an insulating polymer and one of carbon powders, carbon fibers and metal fibers.

8. A string-attached cap according to claim 7, wherein said second electroconductive resin for forming said coupling member has its insulating component consisting of an insulating polymer of a block copolymer including a hard segment and a soft segment, said soft segment containing a polyether component.

9. A string-attached cap according to claim 7, wherein said first electroconductive resin for forming said capping member and said second electroconductive resin for forming said coupling member are each formed of a mixture of an insulating polymer and carbon powder, a content of said carbon powder being set in a range of from 4% to 9% as weight percentage for said first electroconductive resin and in a range of from 3% to 5% as weight percentage for said second electroconductive resin, a combination in which the content thereof in said first electroconductive resin is 9% and the content thereof in said second electroconductive resin is 5% as well as combinations in which the content thereof in said first electroconductive resin is in a range of from 4% to 5% and the content thereof in said second electroconductive resin is in a range of from 3% to 4% are being excluded.

10. A string attached cap according to claim 6, wherein said surface resistance is greater than $2.60 \times 10^{12}$ Ω and less than $5.30 \times 10^{12}$ Ω.

11. A string-attached cap comprising:

a capping member formed of a first electroconductive resin;

a ring member engaged in an outer periphery of said capping member;

an elongated coupling member formed of a second electroconductive resin which is flexible; and a fastening member formed of a third electroconductive resin for fastening one end of said coupling member to said ring member, said ring member being formed of a fourth electroconductive resin, said string-attached cap being used with another end of said coupling member coupled to a vehicle, wherein said first electroconductive resins, said second electroconductive resin, said third electroconductive resin, and said fourth electroconductive resin are formed such that surface resistance from said capping member to said vehicle is set to be greater than or equal to $1 \times 10^{12}$ Ω and less than $5.30 \times 10^{12}$ Ω.

12. A string-attached cap according to claim 11, wherein all of said electroconductive resins are each formed of a mixture of an insulating polymer and one of carbon powders, carbon fibers and metal fibers.

13. A string-attached cap according to claim 12, wherein said second electroconductive resin for forming said coupling member has its insulating component consisting of an insulating polymer of a block copolymer including a hard segment and a soft segment, said soft segment containing a polyether component.

14. A string-attached cap according to claim 12, wherein said first electroconductive resin for forming said capping member and said second electroconductive resin for forming said coupling member are each formed of a mixture of an insulating polymer and carbon powder, a content of said carbon powder being set in a range of from 4% to 9% as weight percentage for said first electroconductive resin and in a range of from 3% to 5% as weight percentage for said second electroconductive resin, a combination in which the content thereof in said first electroconductive resin is 9% and the content thereof in said second electroconductive resin is 5% as well as combinations in which the content thereof in said first electroconductive resin is in a range of from 4% to 5% and the content thereof in said second electroconductive resin is in a range of from 3% to 4% are being excluded.

15. A string attached cap according to claim 11, wherein said surface resistance is greater than $2.60 \times 10^{12}$ Ω and less than $5.30 \times 10^{12}$ Ω.

16. A string-attached cap comprising:

a capping member formed of a first electroconductive resin and having an annular groove formed in its outer periphery; and an elongated coupling member formed of a second electroconductive resin and being flexible, said coupling member having a ring member formed integrally at one end thereof, an engaging part which is formed integrally with an inner periphery of said ring part being rotatably engaged in said annular groove of said capping member, said string-attached cap being used with another end of said coupling member coupled to a vehicle, wherein said first electroconductive resins and said second electroconductive resin are formed such that surface resistance from said capping member to said vehicle is set to be greater than or equal to $1 \times 10^{12}$ Ω and less than $5.30 \times 10^{12}$ Ω.

17. A string-attached cap according to claim 16, wherein all of said electroconductive resins are each formed of a mixture of an insulating polymer and one of carbon powders, carbon fibers and metal fibers.

18. A string-attached cap according to claim 17, wherein said second electroconductive resin for forming said coupling member has its insulating component consisting of an insulating polymer of a block copolymer including a hard segment and a soft segment, said soft segment containing a polyether component.

19. A string-attached cap according to claim 17, wherein said first electroconductive resin for forming said capping member and said second electroconductive resin for forming said coupling member are each formed of a mixture of an insulating polymer and carbon powder, a content of said carbon powder being set in a range of from 4% to 9% as weight percentage for said first electroconductive resin and in a range of from 3% to 5% as weight percentage for said second electroconductive resin, a combination in which the content thereof in said first electroconductive resin is 9% and the content thereof in said second electroconductive resin is 5% as well as combinations in which the content thereof in said first electroconductive resin is in a range of from 4% to 5% and the content thereof in said second electroconductive resin is in a range of from 3% to 4% are being excluded.

20. A string attached cap according to claim 16, wherein said surface resistance is greater than $2.60 \times 10^{12}$ Ω and less than $5.30 \times 10^{12}$ Ω.

* * * * *